US012597436B2

(12) United States Patent (10) Patent No.: US 12,597,436 B2
Ren et al. (45) Date of Patent: Apr. 7, 2026

(54) PRE-ASSISTING MICROWAVE-ASSISTED MAGNETIC RECORDING WITH SPIN-TORQUE NANO-OSCILLATORS

(71) Applicant: Headway Technologies, Inc., Milpitas, CA (US)

(72) Inventors: Haowen Ren, Fremont, CA (US); Wenyu Chen, San Jose, CA (US); Yuhui Tang, Milpitas, CA (US)

(73) Assignee: Headway Technologies, Inc., Miltpitas, CA (US)

( * ) Notice: Subject to any disclaimer, the term of this patent is extended or adjusted under 35 U.S.C. 154(b) by 0 days.

(21) Appl. No.: 18/751,004

(22) Filed: Jun. 21, 2024

(65) Prior Publication Data

US 2025/0391428 A1 Dec. 25, 2025

(51) Int. Cl.
*G11B 5/127* (2006.01)
*G11B 5/00* (2006.01)

(52) U.S. Cl.
CPC .... *G11B 5/1272* (2013.01); *G11B 2005/0024* (2013.01)

(58) Field of Classification Search
None
See application file for complete search history.

(56) References Cited

U.S. PATENT DOCUMENTS 6,785,092 B2 8/2004 Covington et al.
8,570,684 B1 * 10/2013 Contreras ................ G11B 5/02
360/110

8,705,206 B1 * 4/2014 Maeda ................ G11B 5/3116
360/125.3
9,196,271 B1 * 11/2015 Shirotori ................ G11B 5/35
10,325,618 B1 6/2019 Wu et al.
10,424,326 B1 9/2019 Chen et al.
10,490,216 B1 11/2019 Chen et al.
10,714,127 B1 * 7/2020 Chen .................... G11B 5/3116
10,714,132 B1 * 7/2020 Chen ................... G11B 5/4826
10,861,486 B1 * 12/2020 Tang ................... G11B 5/2655
10,937,450 B1 3/2021 Kawasaki et al.
11,568,891 B1 1/2023 Chen et al.
(Continued)

FOREIGN PATENT DOCUMENTS

JP 2017045490 A * 3/2017 ............. G11B 5/235

OTHER PUBLICATIONS

Kiselev, S.I. et al., "Microwave Oscillations of a Nanomagnet Driven by a Spin-Polarized Current", Nature, vol. 425, pp. 380-383, Sep. 2003.

(Continued)

*Primary Examiner* — William J Klimowicz
(74) *Attorney, Agent, or Firm* — DLA Piper LLP (US)

(57) ABSTRACT

The present embodiments relate to a pre-assisting microwave assisted magnetic recording (MAMR) (PA-MAMR) write-head structure where the STO is disposed within a leading shield (LS). The STO can be used to pump energy into the media before the writing process. The STO can also pre-excite the media and let the media oscillation damp over the time and then switch under the writer field. The present embodiments can be easier to increase the magnetic volume and magnetic moment of the free layer, while also achieving a greater oscillation frequency with magnetization oscillations around the axis in the film plane.

20 Claims, 6 Drawing Sheets

(56) References Cited

U.S. PATENT DOCUMENTS

| | | | | |
|---|---|---|---|---|
| 11,615,804 B1* | 3/2023 | Poss | | G11B 5/314 |
| | | | | 360/66 |
| 2011/0205667 A1* | 8/2011 | Yamada | | G11B 5/743 |
| | | | | 360/122 |
| 2011/0279921 A1* | 11/2011 | Zhang | | H10N 50/85 |
| | | | | 360/59 |
| 2013/0329316 A1* | 12/2013 | Watanabe | | G11B 5/315 |
| | | | | 360/78.04 |
| 2015/0310881 A1* | 10/2015 | Koui | | G11B 5/314 |
| | | | | 360/235.4 |
| 2015/0380022 A1* | 12/2015 | Koui | | G11B 5/3133 |
| | | | | 360/99.08 |
| 2016/0027455 A1* | 1/2016 | Kudo | | G11B 5/235 |
| | | | | 360/46 |
| 2018/0075868 A1 | 3/2018 | Koui et al. | | |
| 2018/0330748 A1* | 11/2018 | Liu | | G11B 5/3163 |
| 2020/0075045 A1* | 3/2020 | Narita | | G11B 5/235 |
| 2020/0312354 A1* | 10/2020 | Wu | | G11B 5/3143 |
| 2021/0074322 A1* | 3/2021 | Song | | G11B 5/235 |
| 2022/0165300 A1* | 5/2022 | Liu | | G11B 5/3133 |
| 2023/0083836 A1* | 3/2023 | Liu | | G11B 5/315 |
| | | | | 360/125.3 |
| 2024/0029759 A1* | 1/2024 | Chen | | G11B 5/3146 |

OTHER PUBLICATIONS

Liu, L. et al., "Magnetic Oscillations Driven by the Spin Hall Effect in 3-Terminal Magnetic Tunnel Junction Devices", Physical Review Letters, vol. 109, No. 18, pp. 186602-1-186602-5, Oct. 2012.

Ren, H. et al., "Hybrid Spin Hall Nano-Oscillators Based on Ferromagnetic Metal/Ferrimagnetic Insulator Heterostructures", Nature Communications, vol. 14, pp. 1-7, Mar. 2023.

Zhu, J. et al., "Microwave Assisted Magnetic Recording", IEEE Transactions on Magnetics, vol. 44, No. 1, pp. 125-131, Jan. 2008.

* cited by examiner

300A

Pinned Layer 302A

Free Layer 304A

PMA/H$_{WG}$ m

300B

Pinned Layer 302B

Free Layer 304B

H$_{bias}$ m

400B

400D

PRE-ASSISTING MICROWAVE-ASSISTED MAGNETIC RECORDING WITH SPIN-TORQUE NANO-OSCILLATORS

TECHNICAL FIELD

Embodiments of the invention relate to the field of electro-mechanical data storage devices. More particularly, embodiments of the invention relate to a write head for a disk drive with a spin-orbit torque assisted magnetic write head structure.

BACKGROUND

A magnetic recording medium (e.g., a magnetic disk) can store magnetic bits representing digital data. A magneto-resistive writer can be part of a hard disk drive (HDD) to write digital data to the magnetic recording medium.

As an overall amount of digital data being stored on HDD devices increases, there is an increasing demand for increased data capacity of HDD devices. One technique to increase data capacity for an HDD can include heat-assisted magnetic recording (HAMR) or microwave-assisted magnetic recording (MAMR). HAMR and MAMR techniques increase the density of HDDs by manipulating a portion of the magnetic recording medium, which can enhance write performance of the write head to the magnetic recording medium.

SUMMARY

The present embodiments relate to a pre-assisting MAMR (PA-MAMR) write-head structure where the STO is disposed within a leading shield (LS). The STO can be used to pump energy into the media before the writing process. The STO can also pre-excite the media and let the media oscillation damp over the time and then switch under the writer field. The present embodiments can be easier to increase the magnetic volume and magnetic moment of the free layer, while also achieving a greater oscillation frequency with magnetization oscillations around the axis in the film plane.

In a first example embodiment, a write head for a disk drive is provided. The write head can include a main pole (MP) configured to provide a magnetic flux to a recording medium. The write head can also include a trailing shield (TS) comprising a hot seed (HS) and write shield (WS) to collect a flux from the MP and increase a downtrack gradient.

The write head can also include two side shields (SS) each disposed adjacent to the MP and configured to confine the flux in a crosstrack direction to increase a crosstrack gradient. The write head can also include a leading edge taper (LET) configured to create a taper in a leading side of the MP. The write head can also include a leading shield (LS). The write head can also include a spin-torque oscillator (STO) patterned in the LS. The STO can include a free magnetic layer to generate a rf field and a pinned magnetic layer as a spin polarizer.

In some instances, the free magnetic layer of the STO comprises an out-of-plane axis due to depositing one or more materials comprising any of cobalt (Co)/platinum (Pt) multilayers, Co/palladium (Pd) multilayers, and cobalt-iron-boron (CoFeB)/magnesium oxide (MgO) multilayers, and any magnetic materials that possess perpendicular magnetic anisotropy. The spin torque device can exhibit a circular oscillation mode.

In some instances, the free magnetic layer of the STO comprises an in-plane axis due to depositing one or more magnetic materials comprising any of nickel-iron (NiFe) alloys and iron-cobalt (FeCo) alloys, and any magnetic materials that possess in-plane magnetic anisotropy. The spin torque device exhibits an elliptical oscillation mode or a circular oscillation mode depending on a bias current to generate linear RF signals in elliptical oscillation modes.

In some instances, the pinned magnetic layer of the STO is pinned in an out-of-plane direction or an in-plane direction to provide spin torques to generate a gyromagnetic precession.

In some instances, a thickness of the free magnetic layer ranges from between 5 and 20 nanometers (nm). A width of the free magnetic layer can range between 30 to 400 nm, and a height of the free magnetic layer can range from 20 to 400 nm.

In some instances, the STO extends into the LET. Offsets of the STO with respect to a center track direction can reduce an impact from skew angles.

In some instances, the write head further comprises conductive materials disposed in a write gap (WG) and a leading gap (LG) that allows a bias current to flow, and insulating materials disposed on one or more sides of the WG and the LG to guide and/or concentrate the bias current.

In another example embodiment, a device is provided. The device can include a main pole (MP) configured to provide a magnetic flux to a recording medium. The device can also include a leading edge taper (LET) configured to create a taper in a leading side of the MP. The device can also include a leading shield (LS). The device can also include a spin-torque oscillator (STO) patterned in the LS. The STO can include a free magnetic layer to generate a rf field and a pinned magnetic layer as a spin polarizer.

In some instances, the device can also include a trailing shield (TS) comprising a hot seed (HS) and write shield (WS) to collect a flux from the MP and increase a downtrack gradient and two side shields (SS) each disposed adjacent to the MP and configured to confine the flux in a crosstrack direction to increase a crosstrack gradient.

In some instances, the free magnetic layer of the STO comprises an out-of-plane axis due to depositing one or more materials comprising any of cobalt (Co)/platinum (Pt) multilayers, Co/palladium (Pd) multilayers, and cobalt-iron-boron (CoFeB)/magnesium oxide (MgO) multilayers. The spin torque device can exhibit a circular oscillation mode.

In some instances, the free magnetic layer of the STO comprises an in-plane axis due to depositing one or more magnetic materials comprising any of nickel-iron (NiFe) alloys and iron-cobalt (FeCo) alloys. The spin torque device can exhibit an elliptical oscillation mode or a circular oscillation mode depending on a bias current to generate linear RF signals in elliptical oscillation modes.

In some instances, the pinned magnetic layer of the STO is pinned in an out-of-plane direction or an in-plane direction to provide spin torques to generate a gyromagnetic precession.

In some instances, a thickness of the free magnetic layer ranges from between 5 and 20 nanometers (nm), a width of the free magnetic layer ranges between 30 to 400 nm, and a height of the free magnetic layer ranges from 20 to 400 nm.

In some instances, the STO extends into the LET. Offsets of the STO with respect to a center track direction can reduce impact from skew angles.

In some instances, the device can also include conductive materials disposed in a write gap (WG) and a leading gap (LG) that allows a bias current to flow and insulating materials disposed on one or more sides of the WG and the LG to guide and/or concentrate the bias current.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1A:
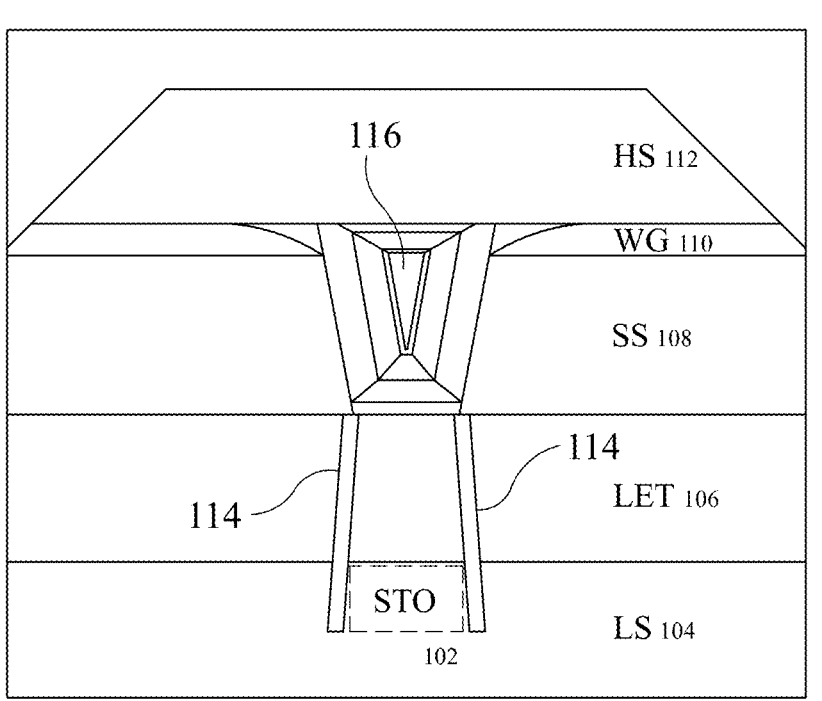
FIGS. 1A-1B illustrate example designs of a write head where the STO is placed right below the leading edge taper (LET) layer according to an embodiment.

A disk drive can include a write head to interact with a magnetic recording medium to read and write digital data to the magnetic recording medium. As the amount of digital data is required to be stored increases and with an increase in data aerial density of hard disk drive (HDD) writing, both the write head and digital data written to the magnetic recording medium can be made smaller.

The HDD industry has been a crucial part in the digital revolution, providing a storage technology for personal computers, servers, and data centers for several decades. With the exponential growth in data generation worldwide, the HDD industry can be used to address the massive demand for data storage. The growth rate of data generation from the world has been exponential in recent years, driven by the widespread use of digital devices, the internet, and cloud computing. According to recent studies, the amount of data generated worldwide is expected to reach 180 zettabytes (ZB) by 2025, up from 33 ZB in 2018.

Such a growth can largely depend on the shrinking media bits and the shrinking write head structures to match the smaller grains. The former can be achieved by larger coercive fields of media grains in perpendicular magnetic recording (PMR). However, the limitations in scaling can arise due to the degraded performance in shrinking write heads operating at the GHz frequency.

Therefore, there is a growing interest in improving the write head performance in HDD with an assist from heat and microwave sources, which instigated the development of heat-assisted magnetic recording (HAMR) and microwave-assisted magnetic recording (MAMR) technologies. Both the HAMR and MAMR technologies can apply energy to the media from an external source to make it temporarily softer so that the degraded writability in the existing write heads is sufficient. To recover the degradation of many PMR write heads, assistive technologies can be developed, which can run a current through the main pole of the write head to minimize unwanted domain formation. Such an effort led to many branches of various PMR writing head designs. All of these current-assisted designs can achieve improvements due to magnetization rotation from the current-induced-Oersted-field distribution.

To achieve higher area density capability (ADC), the write head was originally designed to record longitudinal (LMR) and then migrated to perpendicular magnetic recording (PMR) writers. In recent years, the introduction of trailing shield (TS), leading shield (LS), and side shield (SS) can provide much better downtrack and crosstrack gradients, which can achieve higher track per inch (TPI) and bit per inch (BPI). Besides, as the increase of TPI, the size of MP may need to be further shrunk down, so does the media grain size. However, due to the shrinkage of the MP size and smaller writer gap (WG) and side gap (SG), the writability of the write head can become too weak so that the writer is no longer capable of writing the media with certain thermal stability without losing signal-to-noise ratio (SNR). This can be referred to as a trilemma in media that limits the further improvement of PMR writer head.

To overcome this issue, many kinds of energy assisted writer head have been proposed in the previous years, including microwave assisted magnetic recording (MAMR), Heat assisted magnetic recording (HAMR), etc. In these concepts, by pumping energy directly into the media, the media writability can be dramatically improved without losing thermal stability after information is stored. Within these new technologies, MAMR is one of the most promising approaches to address these issues. MAMR can use microwave to excite the ferromagnetic resonance (FMR) of media, which will reduce its effective uniaxial anisotropy ($H_k$). By reducing the effective anisotropy, the required switching field is consequently reduced. Once the media is moved away from the microwave source, the media can go back to its high anisotropy state to maintain sufficient thermal decay. This can mitigate or effectively solve the trilemma that writer heads are facing. To generate microwave signals in a small region, many different approaches have been contemplated. One of the commonly studied devices is the spin-torque oscillator (STO).

Many MAMR write heads can be mainly categorized into two groups, one is so called flux-controlled MAMR (FC-MAMR), and the other one is the microwave-assisted MAMR (MAS-MAMR). One of the most important features in these MAMR devices is that they contain either a giant magnetoresistance (GMR) switching device or a spin-torque-oscillator (STO) in the WG. In FC-MAMR, a GMR switching device can provide a direct stray field that opposes the gap field when a direct current (DC) is applied to the WG. This spin-current driven switching can increase the gradient and writing field. Different from FC-MAMR, the applied DC current in MAS-MAMR may only make STO starts to oscillate and generate an AC magnetic field into the media. This AC field can couple with media and pump energy into the media to reduce the effective anisotropy. However, placing STO in the WG can limit the total magnetic volume that could be used for MAMR. Further, the gap magnetic field can be alternating with MP polarity and degrade the high frequency performance. These drawbacks may limit the further development of MAMR.

To overcome these issues, the present embodiments relate to a new type of pre-assisting MAMR (PA-MAMR), which can use STO to pump energy into the media before the writing process. The STO elements can be placed in the leading shield (LS), which can pre-excite the media and let the media oscillation damp over the time and then switch under the writer field.

Figure 1B:
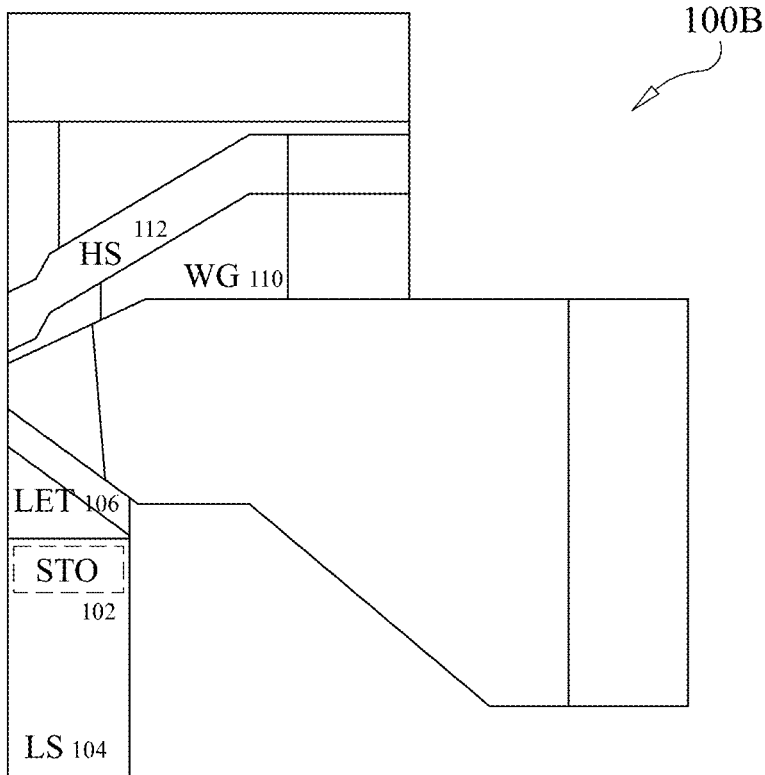

In comparison to other approaches such as FC/MAS-MAMR, a critical feature of the PA-MAMR can include moving STO element from WG to the LS region. FIGS. 1A-1B illustrate example designs of a write head 100A-B where the STO is placed right below the leading edge taper (LET) layer. The black lines can represent insulation layers 114 that restrain the bias current within the STOs.

FIG. 1A illustrates an air-bearing surface (ABS) view and FIG. 1B illustrates an example cross-sectional view of a PA-MAMR 100A-B. In this concept, the STO 102 can be moved from the write gap (WG) 110 to the leading shield (LS) 104.

In FIG. 1A, a device 100A can include a main pole 116, a hot seed (HS) 112 layer, and a WG 110 disposed between MP 116 and HS 112. Further, the device 100A can include side shields 108 disposed adjacent to the MP 116. The device can also include a leading edge taper (LET) 106 and a leading shield (LS) 104. As can be seen in FIG. 1A, the STO 102 can be disposed at the LS 104. Further, insulating layers 114 can be disposed along the LET 106 and LS 104 to guide and restrain a bias current within the STO 102.

Figure 2:
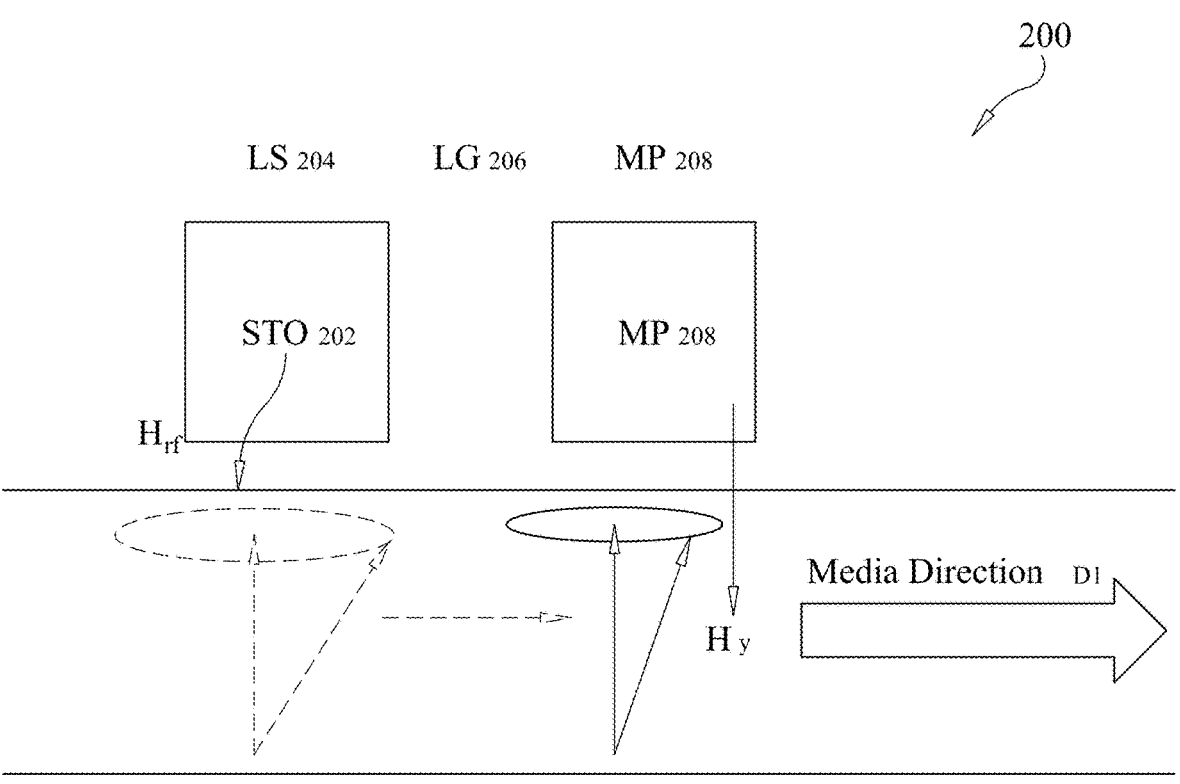
FIG. 2 illustrates an example mechanism of a PA-MAMR write head according to an embodiment.

In MAS-MAMR, the switching magnetic field from MP and the AC magnetic field generated from STO can be acting at the same time during the writing process. Compared to MAS-MAMR, the mechanism of PA-MAMR is similar to the concept in HAMR. As shown in FIG. 2, by pre-exciting the media, with the disk spinning, the pre-excited media bits can quickly move (usually 0.5-5 ns) under the MP and then are switched by the MP writing field.

Numerous advantages can be found when placing STO in the LS, such as an easy dry film deposition and fabrication, with no need to deposit STO on a tilted surface. Further, this can cause pre-exciting the media before reaching the MP region, and can be much easier to increase the magnetic volume and magnetic moment of the free layer. Further, the magnetic field from MP can be weak and is shielded by part of LS, with less impact from MP switching. This design can achieve a much higher oscillation frequency with magnetization oscillations around the axis in the film plane, and can be compatible with various cTPP/TPP/GMAC/GMR3B designs.

FIG. 2 illustrates an example mechanism 200 of PA-MAMR. The media-bit pre-excited by $H_{rf}$ generated from the STO can reach underneath the MP before its magnetization is switched by the MP magnetic field.

As shown in FIG. 2, pre-excited media 210 can be generated by a STO 202 and reach a MP 208 to cause media to be directed in media direction D1. Further, a LS 204, LG 206 can be disposed adjacent to the STO 202 and/or the MP 208.

Figure 3A:
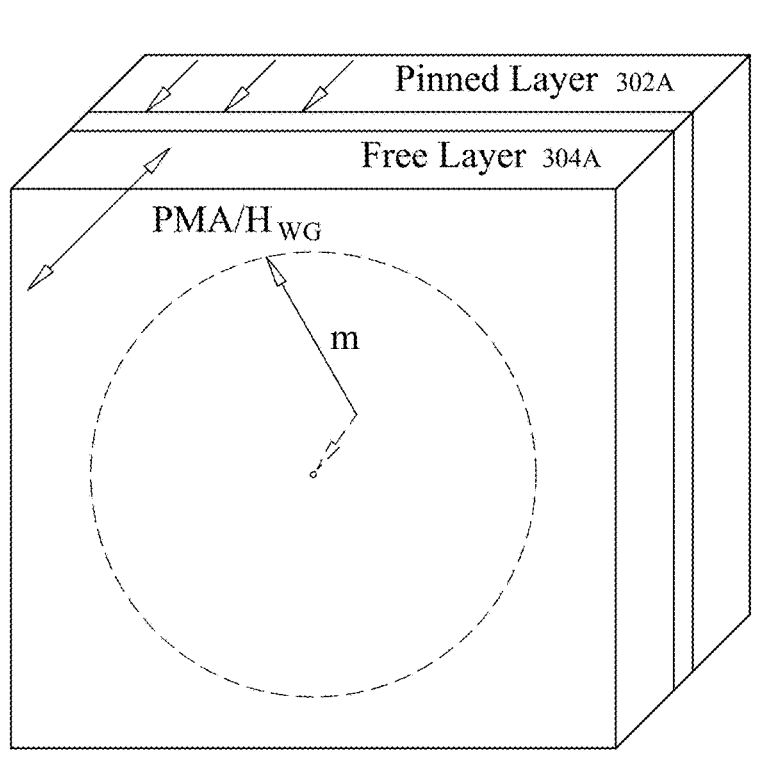
FIGS. 3A-3C example free layer magnetizations in various designs according to an embodiment.
Figure 3B:
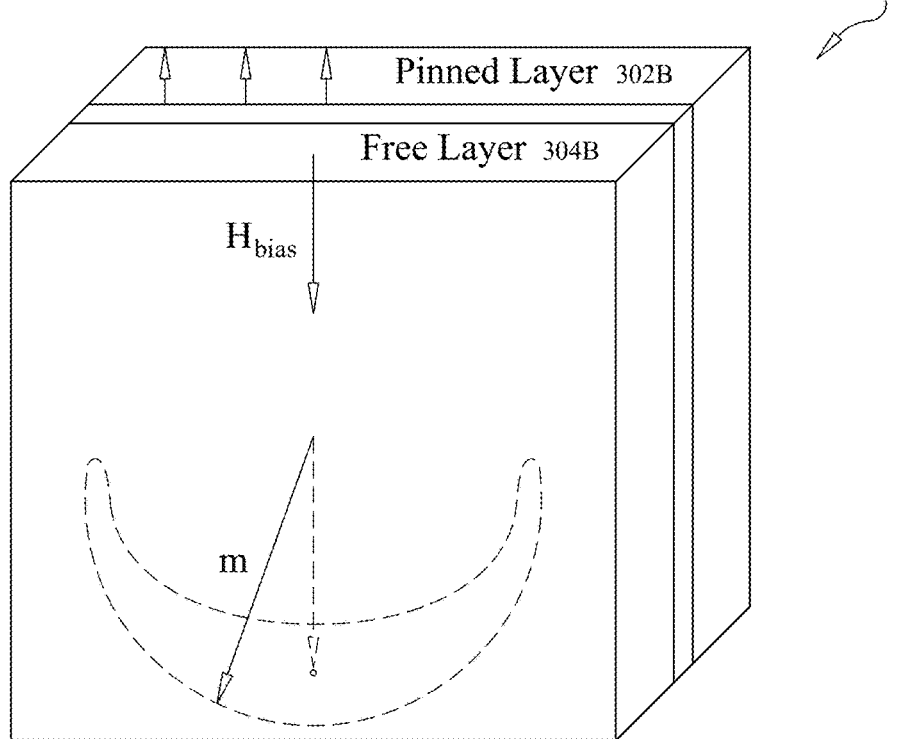
Figure 3C:
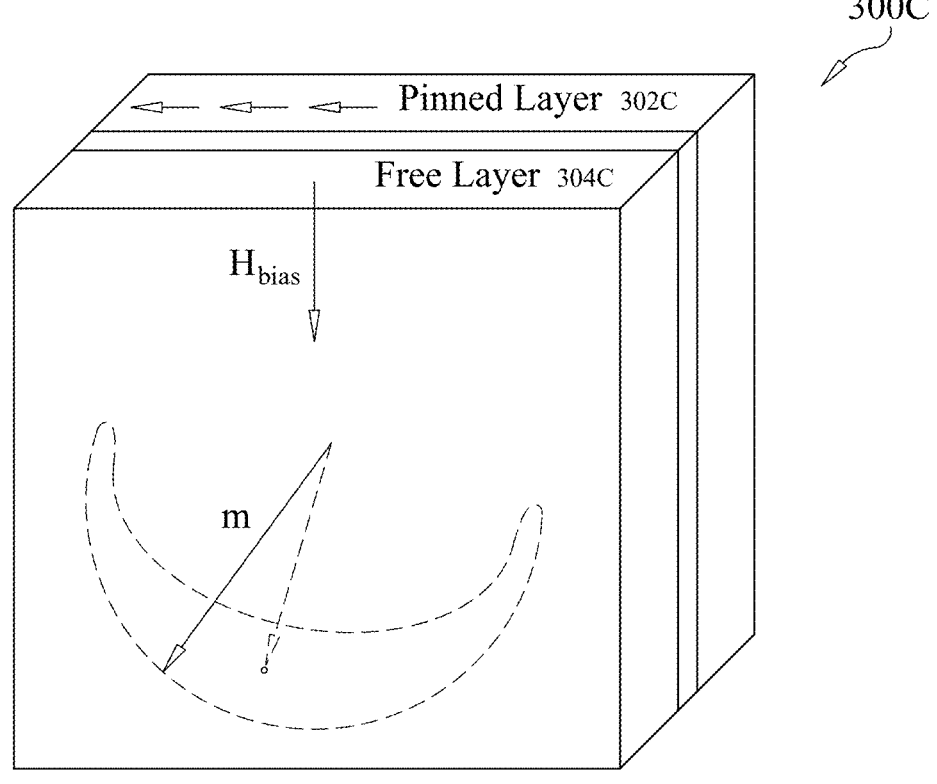

In some instances, one of the critical factors in the present write head designs can be to generate a proper AC field from the STO. In MAS-MAMR, due to the strong gap field in WG, the free layer (FL) magnetization of the STO can be perpendicular to the film plane as it is aligned to the gap field and precesses in circle with a specific chirality, as shown in FIG. 3A, for example. To compensate the chirality preference for different polarity of media bits, alternative current could be used to balance the assist effect. Compared to MAS-MAMR, since the magnetic field in LS is much weaker than that in the WG, the FL of STO in PA-MAMR can be less impacted by the external field and the moment can precess in-plane with an elliptical trajectory as shown in FIGS. 3B-3C. This can be easily achieved by applying a fixed biasing magnetic field to STO, together with a spin current from the pinned reference layer. The direction of the pinned layer magnetization can be critical to generate a correct spin polarization to initiate the oscillation. The pinned layer magnetization can either be collinear or orthogonal to the FL, and the FL magnetization can be driven into oscillations under a right current polarity. The difference is that once the pinned layer is orthogonal to the FL, the incubation time can be much shorter than that under the collinear configuration, as the torque is proportional to the double cross product of spin polarization direction and magnetization direction, which can be maximized when they are orthogonal to each other. The faster incubation time and stronger torque at initial state can also reduce the current onset for FL oscillations, which brings benefit to the performance and reliability.

The frequency of the oscillation can also be greatly increased by moving the STO from WG to LS. According to the Kittle equation, since the magnetization is oscillating out-of-plane in MAS-MAMR the ferromagnetic resonance frequency (FMR) in MAS-MAMR equals to $f=\gamma/2\pi(B-\mu_0 M_{eff})$, where $\gamma$ is gyromagnetic ratio, B is magnetic field, $\mu_0$ is vacuum permeability, and $M_{eff}$ is the effective magnetization. Contrarily, in PA-MAMR, magnetization can be resonating in-plane, which gives $f=\gamma/2\pi(B(B+\mu_0 M_{eff}))^{0.5}$. This can mean that PA-MAMR can achieve much higher frequency at the same external field since the shape anisotropy is helping to increase the resonance frequency. This high frequency oscillation (20-50 GHz) can be preferable for MAMR application as it matches with the oscillation frequency of the media bit better. In addition, the oscillation can generate a linear RF field, which can make the assist insensitive to the chirality of the media's precession.

FIGS. 3A-3C example free layer magnetizations 300A-C in various designs. For instance, FIG. 3A illustrates that, in MAS-MAMR, free layer magnetization oscillating out-of-plane due to strong gap field in WG. The oscillation can follow circular trajectory, and the pinned layer is collinear with free layer. In PA-MAMR, the free layer always lay in-plane and thus it oscillates in ellipse trajectory. This can be achieved by designing magnetization of pinned layer either collinear (as shown in FIG. 3B) or have an angle with respect (as shown in FIG. 3C) to the free layer magnetization.

For instance, as shown in FIG. 3A, a pinned layer 302A can be disposed adjacent to a free layer 304A between a spacer layer. In each configuration 300A-C, the magnetization of the pinned layer 302A-C can change to cause different magnetization directions of the STO. The configuration in FIG. 3A can provide for a circular oscillation mode, as demonstrated by magnetization m of PMA/$H_{WG}$. Further, in FIG. 3B, the orientation of pinned layer 302B and free layer 304B can cause a $H_{bias}$ in a downward direction and a magnetization in an elliptical or circular oscillation mode. In FIG. 3C, the orientation of pinned layer 302C and free layer 304C can cause a $H_{bias}$ in downward a direction and a magnetization in an elliptical or circular oscillation mode.

Furthermore, it can be easy to integrate the PA-MAMR with other technologies such as TPP, cTPP, FC-MAMR, and GMAC, etc., since most of these technologies may only require the bias current passing through the WG. By creating another current path to LS, STO can be easily excited into oscillations state without losing other assists from the WG.

Figures 4A, 4C:
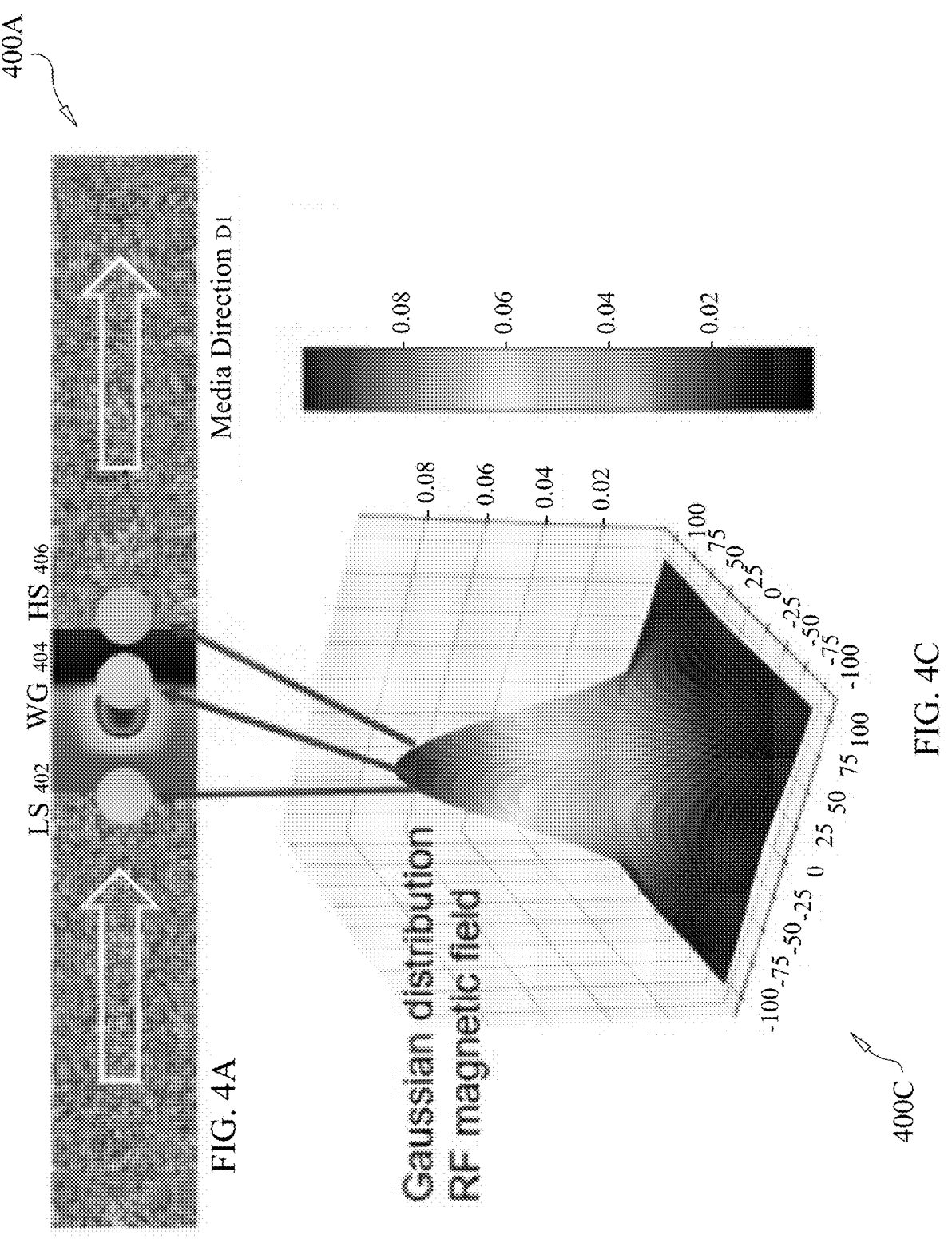
FIGS. 4A-4D illustrate representations of various micromagnetic simulation designs according to an embodiment.
Figure 4B:
Figure 4D:
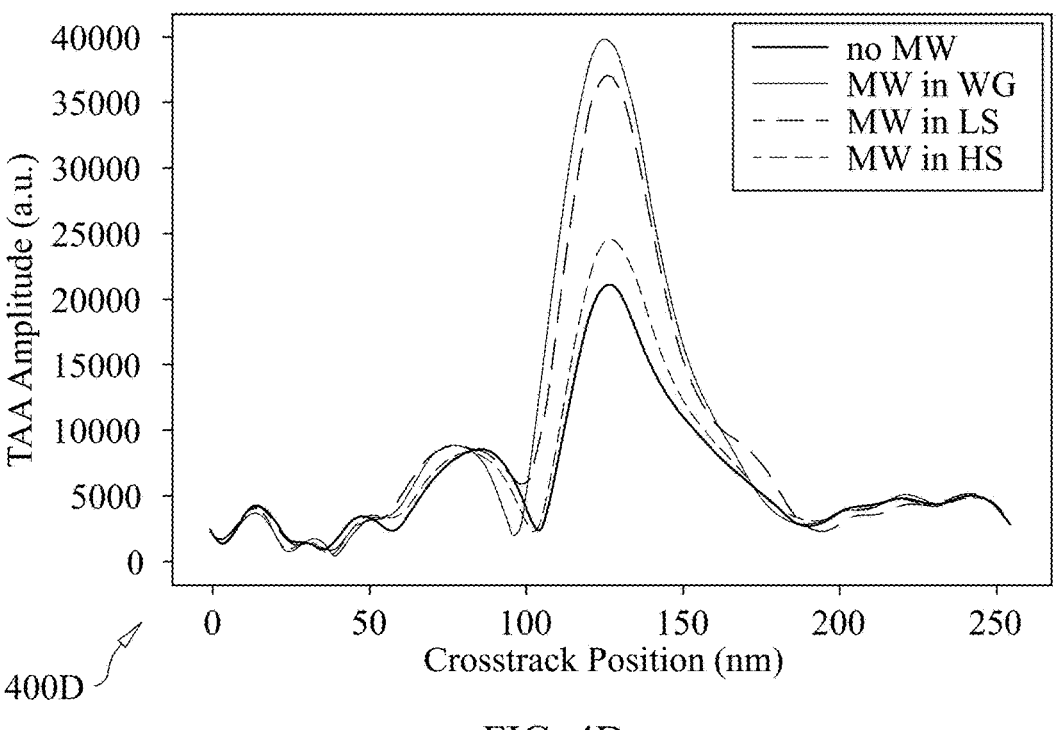

FIGS. 4A-4D illustrate representations 400A-D of various micromagnetic simulation designs. For example, FIG. 4A illustrates a micromagnetic simulation setup for the MAMR design. Dots in FIG. 4A can show different positions for the AC magnetic field at the LS 402, WG 404, and HS 406 in a media direction D1. FIG. 4B illustrates an example writing pattern after the writing process. FIG. 4C illustrates an example simulated AC magnetic field that generated from STO element. FIG. 4D illustrates an example TAA profile as a function of crosstrack position for STO placed in different locations.

To verify the assist gain with the STO at a different location of the writer head, Mumax3 micromagnetic simulations can be carried out on a granular media. For instance, as shown in FIG. 4A, the medium can be segregated into small granular sizes of 8 nm in average and is moving from left to right as a function of time. A writing field pattern can be applied at the center of the track with an alternating frequency of 0.66 GHz to simulate the write process. An AC signal at 25 GHz, with a gaussian distribution signal with a length scale of 100 nm sigma, as shown in FIG. 4C, can be added on top the write field to mimic the total magnetic field onto the medium. The highest amplitude of the rf field at the center of the Gaussian distribution can be set to 1000 Oe, a reasonable value from previous modeling results from the STO. The damping of the media is set to 0.1. The orange dots in FIG. 4A can give the location of this rf field, which is placed at three different locations: in the LS region, in the WG, and in the hot seed (HS) region.

An example write pattern from the simulation can be shown in FIG. 4B. To quantify the impact from the different locations of the rf field, the write patterns can be converted from space domain to frequency domain via fast Fourier transform algorism to estimate the peak signal track average amplitude (TAA) from each simulation. TAA as a function of crosstrack position for different rf field locations can be plotted in FIG. 4D. In comparison to a reference simulation, which can be without any assist from microwave, once the STO's AC field is added in WG and LS, a significant improvement of TAA signal can be seen, indicating a strong assistance from STO during the writing. Besides, the assist to TAA in these two cases are close to each other, meaning the microwave assist can be observed even the STO element is not placed in the WG.

On the contrary, the rf field applied in HS only shows a small assist instead. This distinct difference in assist effect is mainly associated with the movement of the media, since the microwave applied at the HS region will be further away from the MP's writing field, while the microwave applied in the LS can still maintain for a certain period of time before it sees the write field from the MP.

The present embodiments can provide for easy dry film deposition and fabrication, no need to deposit STO on a tilted surface. The media can be pre-excited before reaching the MP region, which can be much easier to increase the magnetic volume and magnetic moment of the free layer. Further, the magnetic field from MP can be weak and is shielded by part of LS, with less impact from MP switching. The present embodiments can achieve a much higher oscillation frequency with magnetization oscillations around the axis in the film plane, and can be compatible with various cTPP/TPP/GMAC/GMR3B designs.

Further, when compared to FC/MAS-MAMR, an example feature of the PA-MAMR is that the STO element can be moved from WG to the LS region. Example schematic drawings of this concept are shown in FIGS. 1A-1B, with the STO typically placed right below the LET layer. The black lines can represent insulation layers that restrain the biasing current in the STO.

In a first example embodiment, a design for pre-assisting MAMR (PA-MAMR) (e.g., as shown in FIGS. 1A-1B) can be composed of a magnetic main pole (MP) that provides a strong and concentrated field to write the medium bit and a magnetic trailing shield (TS) which is composed of hot seed (HS) and write shield (WS) to collect flux from MP and increase downtrack gradient. The design can also include two magnetic side shields (SS) to confine flux in crosstrack direction to increase crosstrack gradient and a magnetic leading edge taper (LET) to create a taper in MP's leading side. The design can also include a magnetic leading shield (LS) that is used to constrain flux and accommodate spin torque devices.

The design can also include a spin torque oscillator (STO) that is deposited to include a free magnetic layer with large moment which is used to generate rf field, and a pinned magnetic layer as a spin polarizer. The STO can be patterned in the LS region. The design can also include conductive materials in write gap (WG) and leading gap (LG) that allows current flow through. The design can also include insulation layers on the sides of the conductive layers (g) that are used to guide and concentrated bias current.

In some instances, the free layer of the STO deposited in LS region can be designed to have out-of-plane easy axis by depositing PMA materials, including but not limited to Co/Pt multilayers, Co/Pd multilayers, CoFeB/MgO multilayers, etc. This type of free layer can exhibit circular oscillation mode, as demonstrated in FIG. 3A, for example.

In some instances, the free layer of the STO deposited in LS region can be designed to have in-plane easy axis by depositing conventional magnetic thin film materials, including but not limited to NiFe alloys, FeCo alloys, etc. This type of spin torque device can exhibit elliptical oscillation mode or circular oscillation modes, depends on the bias current, as demonstrated in FIGS. 3B-3C, for example. This design can be used to generate linear RF signals in elliptical oscillation modes.

In some instances, the magnetic magnetization of pinned layer can be either pinned in out-of-plane direction or in-plane direction, to provide spin torques to generate gyro-magnetic precession.

In some instances, the thickness of the free layer can range from 5 to 20 nm. The width of free layer can range from 30 to 400 nm. The height of free layer can range from 20 nm to 400 nm. The dimensions of the free layer are not limited to above mentioned ranges.

In some instances, the STO in the LS region can be extended to LET region if necessary. Offsets with respective to the center track can be applicable to reduce the impact from the skew angles.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

The invention claimed is:

1. A write head for a disk drive, the write head comprising:
   a main pole (MP) configured to provide a magnetic flux to a recording medium;
   a trailing shield (TS) comprising a hot seed (HS) to collect a flux from the MP and increase a downtrack gradient;
   two side shields (SS) each disposed adjacent to the MP and configured to confine the flux in a crosstrack direction to increase a crosstrack gradient;
   a leading edge taper (LET) configured to create a taper in a leading side of the MP;
   a leading shield (LS);
   a set of insulator layers disposed within the LET and the LS; and
   a spin-torque oscillator (STO) patterned in the LS, wherein the STO includes a free magnetic layer to generate a rf field and a pinned magnetic layer as a spin polarizer, and wherein the set of insulator layers are disposed on opposing sides of the STO and configured to guide a bias current to the STO.

2. The write head of claim 1, wherein the free magnetic layer of the STO comprises an out-of-plane axis due to depositing one or more materials comprising any of cobalt (Co)/platinum (Pt) multilayers, Co/palladium (Pd) multilayers, and cobalt-iron-boron (CoFeB)/magnesium oxide (MgO) multilayers, wherein the STO exhibits a circular oscillation mode.

3. The write head of claim 1, wherein the free magnetic layer of the STO comprises an in-plane axis due to depositing one or more magnetic materials comprising any of nickel-iron (NiFe) alloys and iron-cobalt (FeCo) alloys, wherein the STO exhibits an elliptical oscillation mode or a circular oscillation mode depending on a bias current to generate linear RF signals in elliptical oscillation modes.

4. The write head of claim 1, wherein the pinned magnetic layer of the STO is pinned in an out-of-plane direction or an in-plane direction to provide spin torques to generate a gyromagnetic precession.

5. The write head of claim 1, wherein a thickness of the free magnetic layer ranges from between 5 and 20 nanometers (nm), wherein a width of the free magnetic layer ranges between 30 to 400 nm, and wherein a height of the free magnetic layer ranges from 20 to 400 nm.

6. The write head of claim 1, wherein the STO extends into the LET, wherein offsets of the STO with respect to a center track direction reduces impact from skew angles.

7. The write head of claim 1, further comprising:
   conductive materials disposed adjacent to a leading gap (LG) that allows the bias current to flow.

8. A device comprising:
   a main pole (MP) configured to provide a magnetic flux to a recording medium;
   a leading edge taper (LET) configured to create a taper in a leading side of the MP;
   a leading shield (LS);
   a set of insulator layers disposed within the LET and the LS; and
   a spin-torque oscillator (STO) patterned in the LS, wherein the STO includes a free magnetic layer to generate a rf field and a pinned magnetic layer as a spin polarizer, and wherein the set of insulator layers are disposed on opposing sides of the STO and configured to guide a bias current to the STO.

9. The device of claim 8, further comprising:
   a trailing shield (TS) comprising a hot seed (HS) to collect a flux from the MP and increase a downtrack gradient; and
   two side shields (SS) each disposed adjacent to the MP and configured to confine the flux in a crosstrack direction to increase a crosstrack gradient.

10. The device of claim 8, wherein the free magnetic layer of the STO comprises an out-of-plane axis due to depositing one or more materials comprising any of cobalt (Co)/platinum (Pt) multilayers, Co/palladium (Pd) multilayers, and cobalt-iron-boron (CoFeB)/magnesium oxide (MgO) multilayers, wherein the STO exhibits a circular oscillation mode.

11. The device of claim 8, wherein the free magnetic layer of the STO comprises an in-plane axis due to depositing one or more magnetic materials comprising any of nickel-iron (NiFe) alloys and iron-cobalt (FeCo) alloys, wherein the STO exhibits an elliptical oscillation mode or a circular oscillation mode depending on a bias current to generate linear RF signals in elliptical oscillation modes.

12. The device of claim 8, wherein the pinned magnetic layer of the STO is pinned in an out-of-plane direction or an in-plane direction to provide spin torques to generate a gyromagnetic precession.

13. The device of claim 8, wherein a thickness of the free magnetic layer ranges from between 5 and 20 nanometers (nm), wherein a width of the free magnetic layer ranges between 30 to 400 nm, and wherein a height of the free magnetic layer ranges from 20 to 400 nm.

14. The device of claim 8, wherein the STO extends into the LET, wherein offsets of the STO with respect to a center track direction reduces impact from skew angles.

15. The device of claim 8, further comprising:
   conductive materials disposed adjacent to a leading gap (LG) that allows the bias current to flow.

16. A write head comprising:
   a main pole (MP);
   a trailing shield (TS) comprising a hot seed (HS);
   two side shields (SS) each disposed adjacent to the MP;
   a leading edge taper (LET);
   a leading shield (LS);
   a set of insulator layers disposed within the LET and the LS; and
   a spin-torque oscillator (STO) patterned in the LS, wherein the STO includes a free magnetic layer to generate a rf field and a pinned magnetic layer as a spin polarizer, and wherein the set of insulator layers are disposed on opposing sides of the STO and configured to guide a bias current to the STO.

17. The write head of claim 16, wherein the free magnetic layer of the STO comprises an out-of-plane axis due to depositing one or more materials comprising any of cobalt (Co)/platinum (Pt) multilayers, Co/palladium (Pd) multilayers, and cobalt-iron-boron (CoFeB)/magnesium oxide (MgO) multilayers, wherein the STO exhibits a circular oscillation mode.

18. The write head of claim 16, wherein the free magnetic layer of the STO comprises an in-plane axis due to depositing one or more magnetic materials comprising any of nickel-iron (NiFe) alloys and iron-cobalt (FeCo) alloys, wherein the STO exhibits an elliptical oscillation mode or a circular oscillation mode depending on a bias current to generate linear RF signals in elliptical oscillation modes.

19. The write head of claim 16, wherein a thickness of the free magnetic layer ranges from between 5 and 20 nanometers (nm), wherein a width of the free magnetic layer ranges between 30 to 400 nm, and wherein a height of the free magnetic layer ranges from 20 to 400 nm.

20. The write head of claim 16, wherein the STO extends into the LET, wherein offsets of the STO with respect to a center track direction reduces impact from skew angles.

* * * * *